United States Patent [19]

Ponzoni et al.

[11] 3,767,418

[45] Oct. 23, 1973

[54] PROCESS FOR UPGRADING GREEN COFFEE

[75] Inventors: George B. Ponzoni, Spring Valley, N.Y.; Michael G. Protomastro, Woodridge; Arthur Stefanucci, Clifton, both of N.J.

[73] Assignee: General Foods Corporation, White Plains, N.Y.

[22] Filed: Sept. 28, 1971

[21] Appl. No.: 184,586

Related U.S. Application Data

[63] Continuation-in-part of Ser. No. 90,198, Sept. 30, 1970, abandoned, which is a continuation-in-part of Ser. No. 835,234, June 20, 1969, abandoned.

[52] U.S. Cl. ............................................. 426/461
[51] Int. Cl. ............................................. A23f 1/02
[58] Field of Search............................. 99/65, 68, 71

[56] References Cited
UNITED STATES PATENTS

| 3,640,726 | 2/1972 | Bolt et al. ................................ 99/68 |
| 3,595,668 | 7/1971 | Nutting et al. ........................... 99/68 |
| 3,589,912 | 6/1971 | Adler et al. .............................. 99/68 |
| 2,833,653 | 5/1958 | Chase et al. ......................... 99/68 X |
| 2,712,501 | 7/1955 | Hale et al. ............................ 99/68 X |
| 3,106,470 | 10/1963 | Spotholz ................................ 99/68 |
| 3,088,825 | 5/1963 | Todalian et al. ......................... 99/68 |

Primary Examiner—Frank W. Lutter
Assistant Examiner—William L. Mentlik
Attorney—Bruno P. Struzzi et al.

[57] ABSTRACT

An improved process for upgrading green coffee by contacting green coffee with water and subjecting the mixture to elevated temperatures under pressure has been discovered. The key to the present invention is to control the moisture content of the green coffee and the steam pressure contacting the coffee, thus avoiding undue expansion of the coffee bean by introducing coffee and water into a vessel pressurized by steam such that expansion is inhibited during the treatment. Expansion of the beans on discharge from the pressure vessel is also minimized by avoiding a sudden release of pressure when the beans are discharged from the vessel.

10 Claims, No Drawings

PROCESS FOR UPGRADING GREEN COFFEE

This application is a continuation-in-part of U.S. Pat. application Ser. No. 90,198, filed Sept. 30, 1970, which is a continuation-in-part of U.S. Pat. application Ser. No. 835,234 filed June 20, 1969 both now abandoned.

BACKGROUND OF THE INVENTION

This invention concerns a method for improving the quality of green coffee with characteristically high levels of undesirable flavor and aroma constituents. It is well known that certain varieties of coffees such as Robustas have objectionable tarry, earthy, and bitter flavor notes and these undesirable characteristics have been associated with a high level of undesirable volatiles.

There are many processes shown in the prior art for stripping volatile materials from coffee. Most of these utilize a vacuum steaming procedure. One prior art process described in U.S. Pat. No. 2,278,473 by Albert Musher treats green or roasted coffee at moisture contents below 20 or 25 percent under pressure at elevated temperatures to produce an enhanced coffee bean. In Musher's process the coffee beans are suddenly released from the pressure vessel to obtain an exploded structure. Musher teaches that moisture content is controlled to insure there is not too much moisture in the bean to enable the required explosion.

Recently issued patents including French Pat. No. 2,002,189 published July 31, 1970 and assigned to Procter & Gamble, and U.S. Pat. No. 3,572,235 issued Mar. 23, 1971 and assigned to Hills Brothers, teach steam treating coffee under pressure at moisture contents up to 35 percent water and 18 percent water, respectively, to upgrade the coffee flavor. Two earlier U.S. Pats. No., assigned to General Foods, Nos. 3,088,825 and 3,106,470, teach steam pressure roasting of green coffee to develop roasted beans of unusually high soluble solids content.

While some improvement in the flavor characteristics may be achieved via the prior art processes, the present invention of overtly adding water to green coffee and then steaming the mixture under specific pressure conditions has been found to produce additional upgrading in the flavor of low cost coffees such as Robustas and certain Brazilian coffees.

SUMMARY OF THE INVENTION

Certain low-grade coffee characterized as having tarry, moldy, dirty, and earthy notes is contacted with water and treated in a confined pressure vessel at elevated temperatures in order to upgrade the flavor characteristics of the coffee. Unexpectedly, addition of water to the beans and treatment of the wet coffee with steam to produce a final green coffee having an as is moisture content of above 35 percent by weight water yields beverages after roasting with more desirable characteristics. Water may be added before, during, or after charging green coffee to the treatment vessel, the only critical factor being that an amount of water is added sufficient to insure that the treated coffee discharging from the vessel has a moisture content of between above 35 percent and preferably from 40-50 percent water on an as is basis.

DESCRIPTION OF THE PREFERRED EMBODIMENT

Green coffee is mixed with water in a pressure lock and fed into a continuous pressure digester which is maintained at a pressure of about 50–140 p.s.i., preferably by the addition of steam. The coffee and water mixture is instantaneously exposed to high steam pressure and the water is drawn into the green coffee, rapidly increasing the coffee's moisture content. The coffee is conveyed through the digester is about 1–10 minutes, preferably about 5 minutes or less, say from 1–5 minutes, and is discharged via a pressure lock wherein vapors are vented off such that the beans on discharge from the lock are essentially at atmospheric pressure. It is necessary to expose the water moistened green coffee to a steam treatment under pressure in order to enable steam to penetrate throughout the coffee and affecting volatile flavor materials in the green coffee bean and its porosity, such that on discharge from the vessel followed by subsequent roasting, the flavor of the finished roasted coffee is improved. One method of obtaining the steam is to volatilize some of the water introduced into the digester by applying heat externally to the digester through a heating jacket or the like. Preferably, the coffee and water mixture is treated by introducing live steam into the digester. The exact technique is not critical provided sufficient water is present with the green coffee under steam pressure to produce treated coffee discharging from the vessel having a moisture content above 35 to 55 percent, preferably 40–50 percent water based on the weight of the wet beans. It has been found that when adding live steam to the pressure vessel as the only heat source, that the most desirable ratio of water to green coffee is one part water to one part coffee. However, this ratio may be varied depending on the variety of green coffee being treated and other processing conditions employed—the key to maximizing improvement in flavor being to insure that the final moisture content of the treated and discharged coffee is above 35 percent, and preferably 40–50 percent by weight water. While excellent results have been obtained at moisture levels of 20–32 percent water, and at moisture levels of 45–55 percent water, the best upgrading in green coffee flavor, as determined after roasting and brewing the coffee, is produced at a moisture level after treatment of 40–50 percent water on an as is basis. The proper amount of moisture and steam to be added in treating green coffee in order to achieve a desired final moisture content can be readily ascertained via a few simple experiments.

It has been found that steam pressure treatment of a mixture of water and green coffee is most critical. The amount of water absorption by the green coffee beans is high—up to about equal parts of water added to the coffee. For example, increases of 15 percent, 21 percent, and 26 percent on an absolute basis were observed in treating green beans moistened with an equal weight of water and treated at pressures of 70, 90, and 125 p.s.i., respectively for 5-minute intervals, compared with green beans treated in a similar fashion but not contacted with water. Increases in the amount of water added beyond an equal weight basis water to green coffee beans does not appreciably further increase the quantity of water absorbed. Hence, higher levels of water addition result in only smaller increments of water absorption, while risking greater solids lost in residual water which is not absorbed. For Robusta coffee, it has been determined that the optimum ratio of water to green coffee beans is about 1:1; while with Brazilian Paranas, the optimum water to coffee ratio is 0.5 parts water to one part of coffee. Selection of the proper ratio for the particular variety of bean is easily done with several experiments. The proper ratio is determined by the amount of water necessary under the conditions of time and temperature selected for treatment to produce a moisture content in the treated and flavor improved green bean of 40–50 percent water.

Next to the addition of water, the next critical processing variable is the steam pressure employed to treat the wetted green coffee. The steam pressure selected regulates not only pressure but the temperature of the environment surrounding the green coffee, since saturated steam is normally employed. Of course, wet steam or super-heated steam could be employed with slight adjustment in the amount of water added to the green coffee, but saturated steam is preferred since it is readily available. It has been found in following the prior art processes where the green coffee is not treated with water, that very little difference in the final moisture content of treated green coffee beans is observed when treated at 70, 90, and 125 p.s.i. steam. However, when a mixture of one part green coffee and one part added water is treated, a 9 percent incremental increase in final moisture content is observed between processing at 70 and 90 p.s.i. Hence, while control of steam pressure in the prior art process was not critical, it becomes so when prewet coffee is to be treated. In treating prewet coffee, it has been found that below a steam pressure of about 50 p.s.i., the upgrading effect of treatment is insufficient to produce the desired characteristics in the final roasted and brewed coffee beverage. Also, at steam pressures of above 140 p.s.i. there has been found an undue downgrading in desirable coffee characteristics, and again the flavor characteristics of the final beverage are not sufficiently improved. A steam pressure of 90 p.s.i. for treating the wetted green coffee has been found most desirable and a preferred operating range is from 70–110 p.s.i. steam pressure.

The effect of residence time on the green coffee final moisture content and flavor when treated with pressurized steam is not, apparently, as critical as was the quantity of water added to the green coffee or the pressure of the steam employed in treating the green coffee. However, it is desirable to minimize the time of exposure of the green coffee to stream in the pressure vessel. At higher steam temperatures and pressures, the time period necessary to upgrade the coffee will be a minimum. Generally, in the process of this invention the beans are maintained in the pressure vessel for 1–10 minutes, usually about 1–5 minutes with a preferred treatment time of 2–4 minutes.

The temperature within the vessel is fixed by the type of steam employed and by heat losses which occur in the process. Ideally, the temperature should approach the temperature of saturated steam at the pressure being maintained within the vessel. Generally, in employing saturated steam, the temperature will normally be maintained at from 240°–350° F within the pressure vessel, more particularly 310°–350° F.

The treated coffee after steam treatment is discharged through a pressure lock, generally a rotary valve. The treated beans can be passed through the lock very rapidly as long as a sufficient period of time is allowed to vent off the vapors being discharged with the coffee beans, such that when the beans are finally discharged they are at or close to atmospheric pressure and do not, therefore, undergo substantial puffing or expansion. Some puffing is to be expected during the steam treatment and on release to the atmosphere. This is because as water is taken into the green coffee, a natural swelling occurs. We have found that in following the process of this invention, the treated green coffee which has been dried is normally up to 25 percent lighter than untreated dry green coffee, although less than a 10 percent decrease in bulk density due to treatment is more typical. Therefore, there is apparently a slight irreversibility in that once the bean is expanded, it does not shrink completely to its original size after drying. However, quite unexpectedly we have found that once the coffee is dried and then is roasted by conventional means, the steam treated dried and roasted whole coffee has a bulk density of up to 30 percent heavier than untreated roasted green beans with a 10–20 percent increase in bulk density more typical.

It is possible directly after steam treatment to convey or otherwise tranpsort the treated green wet beans to conventional roasting equipment and to roast the beans to the final desired roast color. However, we have found it preferable to first air dry the treated green coffee to a stable moisture content generally below 15 percent, and then to conventionally roast the dried, treated coffee. This procedure, in addition to allowing greater flexibility of processing by allowing storage of the treated green coffee prior to roasting, has the further advantage that the drying apparently modifies the structure of the dry green coffee such that less expansion than normal is obtained during roasting. This results in a heavier bulk density and provides economies in packaging the roasted coffee for sale. It further suggests economies in soluble processing due to higher or heavier column loads during percolation.

Drying can be accomplished in any suitable dryer such as those employing heated air and generally those employing a drying method where various temperature zones of heated air are used. We have found that a drying temperature starting at about 250° F at the feed end of the dryer and discharging at about 140° F is sufficient to produce a stable coffee having a moisture content averaging below 15 percent. It is important to design the dryer so that the chaff normally present with green coffee, particularly after steam treatment, does not build up in the dryer. The chaff problem can also be solved by removing the chaff prior to drying the green coffee such as by passing the green coffee beans over a vibrating screen and subjecting them to a water spray to wash away any chaff that is present.

Expert panel evaluation indicates that best flavor upgrading for low-grade coffees characterized as having very strong, tarry, moldy, dirty, and earthy flavors is obtained from green coffee treated with from 0.25 to 1.5 parts water, preferably 0.4 to 1.2 parts water per one part of green coffee by weight, at a steam pressure of from 50 p.s.i. to 140 p.s.i., preferably 70 p.s.i. to 110 p.s.i., and residence times in the order of 1–10 minutes, preferably about 5 minutes. Green coffee treated under these conditions is characterized as much cleaner in flavor than control with only slight tarry and slight earthy notes. Most of the tarry character, as well as usually all of the moldy, swampy flavor is removed. Water addition plays a significant role in removing these undersirable flavors. Green coffee treated under the same pressure treatment conditions with no water added, while slightly improved over the original coffee flavor, still retains a high degree of the tarry character and some moldy flavor notes present in the initial green coffee. Thus, the process of this invention affords a significant further improvement in the art of steam treating green coffee.

While this process of upgrading is particularly applicable to Robusta coffee, the process has also been found to upgrade other varieties such as Arabica coffee from Brazil typified by Paranas, while removing some objectionable flavors, the processing also appears to produce a more Milds-type acid flavor from the Brazilian coffee.

While it is preferred to treat each variety of coffee separately so as to optimize process conditions of water addition, temperature, steam pressure, and residence time, it is possible to treat blends. However, a further advantage of processing each variety separately is that the treated and usually dried variety can then be conventionally roasted to its optimum roast color and then blended with other roasted coffees to produce the final blend for sale as regular coffee, or for further processing into soluble coffee.

The process of this invention will be further described with references to the following examples:

EXAMPLE I

Green coffee comprising a blend of Robusta (low-cost Robusta coffees such as Madagascar, Camerouns, Undergrade Ugandas, Indonesians) and Undergrade Milds (such as Perus, Costa Ricas, Ecuadors) were placed in a jacketed autoclave and an equal amount of water was added to the autoclave. The vessel was sealed and heat was applied to vaporize the water and increase the pressure within the autoclave to 90 p.s.i. It took approximately 3 minutes to raise the pressure within the vessel to the desired point. Sufficient heat was maintained in the jacket of the autoclave to maintain the 90 p.s.i. pressure for a period of 3 minutes. The vapors were then vented out of the vessel over a period of 3 minutes to reduce the pressure within the vessel to almost atmospheric pressure and the green coffee was discharged from the autoclave. The coffee was then roasted by standard techniques.

The roasted coffee was roasted, ground, and percolated in a home percolator and the resultant brew was found to be superior in flavor to a brew prepared from an equivalent blend of green coffee which was not subjected to the upgrading treatment.

EXAMPLE II

A blend of green coffee equivalent to that used in Example I was mixed with an equal amount by weight of water and fed through a pressure lock into a continuous pressure digester which was at 90 p.s.i. pressure. Sufficient heat was applied to the jacket of the digester to vaporize the water introduced with the coffee. The coffee beans in this manner were almost instantaneously exposed to the final pressure of 90 p.s.i. The flights in the digester carried the beans from the inlet end to the discharge end in 3 minutes and the beans were then discharged via a second rotary pressure lock. In the discharge lock the beans were carried in compartments and the pressure within a compartment was reduced to atmospheric pressure before the beans were discharged to the atmosphere. By relieving the pressure while the beans were in a confined zone, undue expansion of the beans was avoided. The green coffee was then roasted in a conventional manner and the roasted coffee was ground and percolated as in Example I. It was found that the flavor characteristics of the resultant brew were far superior to untreated green coffee and showed a definite advantage over the coffee which has been treated in the autoclave of Example I.

EXAMPLE III

To a Bauer No. 459 M & D Digester designed to cook cellulosic materials is charged continuously 2,000 lbs. per hour of green coffee. Traveling compartments formed by conveyor flights transport the product within the digester through the steam pressure atmosphere. The digester is a cylindrical vessel closed at each end and installed at a 45° angle. The tank is divided along its axis into two segments by a flat, hollow beam which may be used to indirectly heat the vessel's contents. The beam terminates before reaching each end of the cylinder. At the lower end of the cylinder there is an idler shaft, while at the upper end of the cylinder there is a drive shaft. These shafts form the end shafts of an endless flight conveyor driven by the top shaft and maintained under tension by the lower shaft. The lower shaft is attached to a hemispherical head that forms the housing, similar in section to a segment of the vessel. The green coffee and water to contact the coffee are introduced to a rotary valve fixed to discharge into the vessel 2,000 lbs. of coffee per hour. The green coffee falls onto the flat, hollow beam where it is confined between constantly moving flights of the conveyor. The flights carry the coffee down the top side of the hollow beam around the lower end, and then up the bottom half of the divided vessel to a discharge at the elevated end of the digester where the material is released through another rotary valve. When employing live steam for direct heating, the steam is added through injectors into the digester. Their position is about two-thirds of the way from the bottom of the digester to the inlet. Steam can also be added through the rotary feed valve to prevent buildup of loose coffee particles. Temperature and pressure is easily controlled by regulating the inlet steam pressure, and the retention time within the digester is controlled by regulating the speed of movement of the conveyor belt, and by controlling the rotation rate of the rotary valves feeding and discharging the digester. The water added with the green coffee is generally absorbed by the coffee, and while a small liquid head may be present in the lower portion of the digester, it is preferred to minimize this in order to prevent solids loss.

Two types of coffee—one Robusta from Madagascar and one Brazilian Paranas—were individually treated in the previously described digester. Steam pressure was regulated at 90 p.s.i. with 100 percent water added to the Madagascar coffee and 50 percent water by weight of coffee added to the Brazilian coffee, as each was fed through the rotary valve. Each type of coffee was subjected to the 90 p.s.i. steam for an average residence time of 5 minutes and was then discharged through the discharge rotary valve. On discharge, the average moisture content of the Madagascar coffee was 48 percent water on a wet basis varying from 47–50 percent; and the average moisture content of the Brazilian coffee was 43.4 percent water on a wet basis varying from 40.2 to 46 percent water. The wet beans were passed over a Sweco vibrating screen and washed with water to remove chaff and other small insoluble particles present with the green bean. Each coffee was separately air dried to a stable moisture content of below 15 percent. During the run some of the added water and/or heating steam collected in the digester at an average of 300 lbs. an hour was removed, representing 15 percent by weight of the beans treated. Because the amount of condensate was minimized, the solids removed with this condensate, averaging about 0.2 percent, was not appreciable. After drying, the green bean bulk density was measured and was found from Madagascar to be 4 percent lighter at 39.7 lbs./cu.ft. vs. 41.5 lbs./cu.ft. for untreated coffee; whereas the Brazilian was 7 percent lighter at 33.8 lbs./cu.ft. vs. 36.6 lbs./cu.ft. for untreated coffee. The dried coffee was separately roasted in a conventional Probat roaster to a roast color typical for these coffees, namely, 85 roast color for Madagascar and 60 roast color for the Brazilian coffee. The bulk density of the whole roasted bean was unexpectedly found to be heavier than untreated roasted control for Madagascar, being 12 percent heavier at 28.8 lbs./cu.ft. vs. 25.7 lbs./cu.ft.; and for the Brazilian 25 percent heavier at 26.5 lbs./cu.ft. vs. 21.1 lbs./cu.ft. for untreated roasted control. For Madagascar coffee it was found that roasted control. For Madagascar coffee it was found that at least 40 percent more of this type of coffee could be employed in a blend without noticeable flavor difference.

Green coffee which has been upgraded by the process of this invention can be used to prepare improved coffee products in any of the known commercial processes. Thus, an improved soluble coffee as well as improved vacuum packed coffees can be achieved by using the process of this invention to upgrade the quality of the green coffee. The term "p.s.i." as used herein refers to pounds per inch gauge pressure.

The process of this invention is also useful as a cleaning method for green coffee beans prior to their roasting. The steaming process removes dirt and other non-coffee material from the surface of the green bean. The process also removes the silver skin or outer layer of the green coffee bean. The process thus provides a green bean which when roasted is not contaminated with non-coffee materials and which further does not produce the quantity of chaff conventionally produced during roasting.

The foregoing examples were for illustrative purposes only and the scope of this invention is intended to be limited only by the appended claims.

We claim:

1. A process for upgrading green coffee comprising:
    contracting one part green coffee with 0.25–1.5 parts water by weight to form a mixture;
    subjecting the mixture in an enclosed pressure vessel to a steam pressure maintained at 50 to 140 p.s.i. for from 1 to 10 minutes;
    releasing the pressure and allowing the coffee to come to atmospheric pressure, thus depressurizing the coffee; and
    roasting the coffee, said green coffee and water mixture containing an amount of water effective to produce a moisture content in the depressurized coffee of above 35 percent to 55 percent by weight of the wet coffee.

2. The process of claim 1 where the amount of water is effective to produce a moisture content of 45 to 55 percent by weight of the wet coffee.

3. The process of claim 1 wherein one part green coffee is contacted with 0.4–1.2 parts water and the mixture is subjected to a pressure of 70 to 110 p.s.i.

4. The process of claim 3 wherein the coffee is retained in the vessel for from about 1 to about 5 minutes.

5. The process of claim 1 wherein the vessel is a continuous pressure vessel wherein the coffee is conveyed from a feed end to a discharge end, the coffee being introduced through a pressure lock at the feed end and discharged through a pressure lock at the discharge end.

6. The process of claim 5 wherein the coffee and water are mixed together in the pressure lock at the feed end of the vessel and rapidly introduced into the pressure vessel.

7. The process of claim 1 in which an external source of steam is employed to directly contact the green coffee in the vessel.

8. The process of claim 1 wherein the steam pressure is produced by indirect heating of water present in the vessel sufficient to produce the steam pressure.

9. The process of claim 1 which further includes drying the steamed coffee to a stable condition prior to roasting the coffee.

10. The process of claim 9 wherein the wet steamed green coffee is air dried to below 15 percent moisture.

* * * * *

UNITED STATES PATENT OFFICE
CERTIFICATE OF CORRECTION

Patent No. 3,767,418        Dated October 23, 1973

Inventor(s) George B. Ponzoni et al

It is certified that error appears in the above-identified patent and that said Letters Patent are hereby corrected as shown below:

In Column 1, Line 29 after "No." and before "published" change ...2,002,189... to read ...2,022,189...

Sigend and sealed this 6th day of August 1974.

(SEAL)
Attest:

McCOY M. GIBSON, JR.
Attesting Officer

C. MARSHALL DANN
Commissioner of Patents